United States Patent
Garner

(10) Patent No.: US 6,704,835 B1
(45) Date of Patent: Mar. 9, 2004

(54) POSTED WRITE-THROUGH CACHE FOR FLASH MEMORY

(75) Inventor: Richard P. Garner, Cameron Park, CA (US)

(73) Assignee: Intel Corporation, Santa Clara, CA (US)

( * ) Notice: Subject to any disclaimer, the term of this patent is extended or adjusted under 35 U.S.C. 154(b) by 68 days.

(21) Appl. No.: 09/669,609

(22) Filed: Sep. 26, 2000

(51) Int. Cl.⁷ .............................................. G06F 12/00
(52) U.S. Cl. .................. 711/103; 711/158; 365/185.33; 710/5
(58) Field of Search .............................. 711/103, 100, 711/118, 151–152, 158; 365/185.03, 185.33, 185.11, 185.14, 185.29, 185.3, 218; 710/5, 52–57, 310

(56) References Cited

U.S. PATENT DOCUMENTS

| | | | |
|---|---|---|---|
| 5,559,988 A | * 9/1996 | Durante et al. | 711/152 |
| 5,619,452 A | * 4/1997 | Miyauchi | 365/185.29 |
| 5,715,424 A | * 2/1998 | Jesionowski et al. | 714/24 |
| 5,799,168 A | * 8/1998 | Ban | 711/103 |
| 5,999,446 A | * 12/1999 | Harari et al. | 365/185.03 |
| 6,026,465 A | * 2/2000 | Mills et al. | 711/103 |
| 6,301,635 B2 | * 10/2001 | Bothwell et al. | 711/103 |

FOREIGN PATENT DOCUMENTS

| | | |
|---|---|---|
| EP | 0 392 895 A2 | 3/1990 |
| EP | 0557736 A2 | 9/1993 |
| EP | 0833251 A1 | 4/1998 |
| WO | WO 97/13204 | 4/1997 |

OTHER PUBLICATIONS

Andrew S. Tanenbaum, Structured Computer Organization, 1984, Chapter one, pp. 10–11.*

* cited by examiner

*Primary Examiner*—Nasser Moazzami
(74) *Attorney, Agent, or Firm*—Blakely, Sokoloff, Taylor & Zafman LLP

(57) ABSTRACT

A cache memory for operations to a flash memory. A flash memory manager places flash write and flash erase commands into a cache, for subsequent execution by the flash memory. The cache can replace a queue used in conventional flash memory systems. A foreground manager can perform a check for available space in the flash memory, break up the command into appropriate cache entries, and write the entries into the cache. A background manager can subsequently read the entries from cache and execute them to flash memory, deleting each cache entry as it is posted to flash memory. The cache can include multiple sets of tag/data arrays, each dedicated to commands with a particular priority. Relocating most conventional flash management functions from background to foreground can eliminate the possibility of "flash full" responses from the background manager, thus eliminating the need for the background manager to determine whether space will be available for the command when it is executed to flash.

22 Claims, 4 Drawing Sheets

POSTED WRITE-THROUGH CACHE FOR FLASH MEMORY

BACKGROUND OF THE INVENTION

1. Field of the Invention

The invention pertains generally to computer systems. In particular, it pertains to flash memory operations in computer systems.

2. Description of the Related Art

Flash memory is a specialized type of memory that permits data to be written and read one byte at a time, but it can only be erased in entire blocks. Typical block size in flash devices ranges from 8 kilobytes (KB) to 128 KB. The data stored in flash memory locations cannot be changed without erasing the locations first. Since only entire blocks can be erased, the new data must be written into unused locations of a previously erased block, and any pointers that identify the location of the data must be changed accordingly. If a large section of data must remain intact (such as an indexable table of values), the entire section must be copied to another block, even if only one byte was changed. The erase function is time-consuming, and can take as much as one full second to accomplish.

Flash memory has fairly good performance for read operations, but for the aforementioned reasons has relatively poor performance for write and erase operations. Flash memory managers have been developed to isolate application programs from flash memory management. FIG. 1 shows a conventional flash memory system 10. A conventional flash memory manager 11 involves the use of a foreground manager 12, a background manager 14, and a data queue 13. Data queue 13 provides temporary buffer storage for write and erase commands from application program 15 before they are actually executed to the flash memory 16. This permits the application programs to be decoupled from the erratic latency periods that are imposed by the characteristics of flash memory. The data queue can also help to resolve concurrency problems. If application program 15 tries to read a location after a write command to that location has been placed in data queue 13, but before the data in flash memory 16 has actually been changed, the most recent version of the data can be read from the data queue.

Foreground manager 12 interfaces with the application program, initiates read and write functions, and places the write commands into data queue 13. Read commands can be sent directly to flash memory 16 by the foreground manager. Background manager 14 takes the write commands from queue 13, generally on a first-in first-out basis, and initiates the actual memory operation to flash memory 16. Foreground manager 12 also detects if there is available space in flash to perform a write operation, through the space-available function 17. If not, it can inform the application program of this fact and abort the write or take some other remedial action. If space is available, the write command can be placed in the queue and the application program informed that the write has taken place. However, the background manager decides just how to write data and associated data structures into flash memory 16, and these decisions can affect how much space is actually available when the write operation is removed from the data queue and processed by the background manager. Foreground manager 12 therefore predicts whether the command will be successful (whether space will be available when the command reaches flash), and places the command in queue 13 if success is predicted. If background manager 14 encounters a "flash full" condition" when it tries to execute the command because flash memory 16 has insufficient space in which to write the data, a fatal error code is generated and normal processing may be shut down. To prevent this, foreground manager 12 must make worst-case predictions, leading to inefficient flash memory operations.

When determining if sufficient space is available before attempting a write operation to flash memory 16, background manager 14 basically re-executes the space-available function, thereby resulting in duplication of effort by flash memory manager 11. If flash memory manager 11 is executed in software or firmware, as it typically is, the foreground and background space-available functions are executed at different times, doubling the amount of time devoted to the space monitoring process and negatively impacting the throughput performance of flash memory management.

DETAILED DESCRIPTION OF THE INVENTION

The invention can include a cache memory with a flash memory manager to improve the ability to effectively manage flash operations. The cache memory can eliminate the conventional flash manager data queue and the duplication of effort associated with processing commands, by processing those commands in the foreground, and caching the write/erase components of the commands. Background decision-making and complexity can therefore be significantly reduced by moving many of the typical background functions to the foreground manager. The invention can also eliminate the need for command prediction and its associated error processing, by eliminating background "flash full" conditions.

Figure 1:
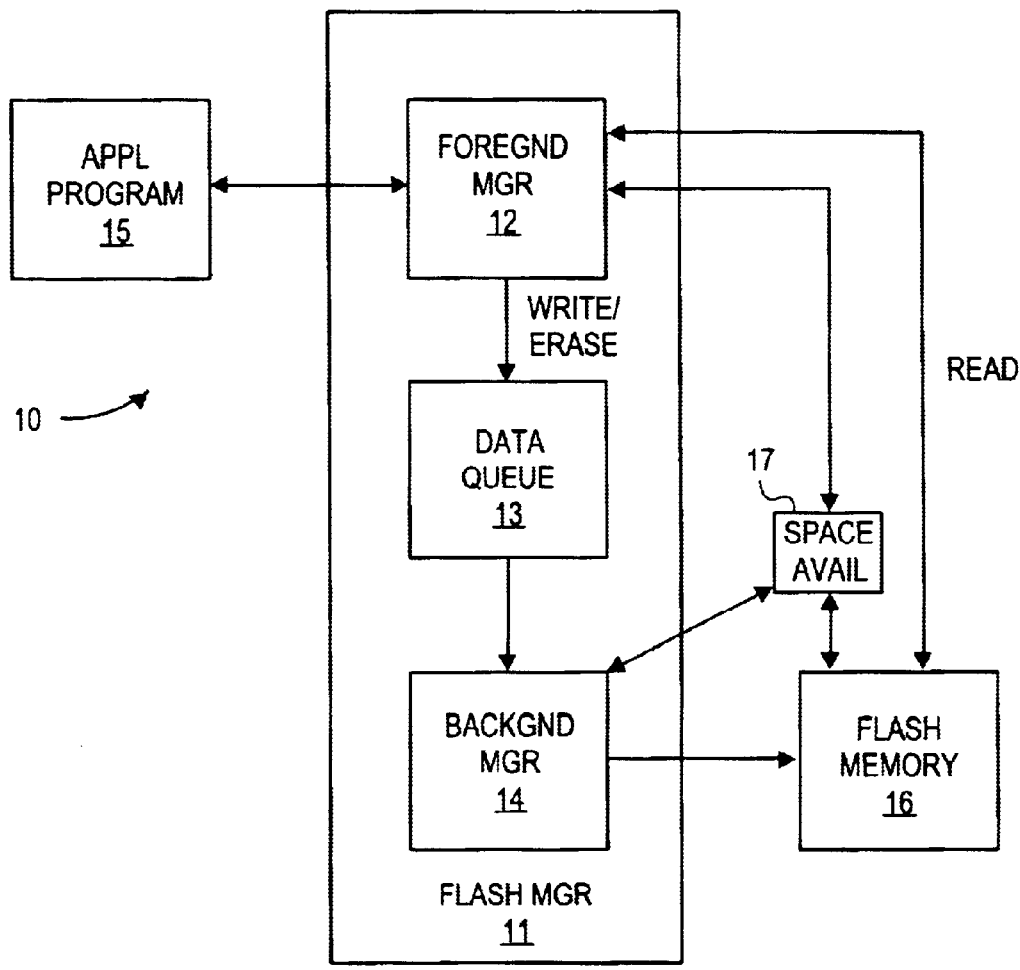
FIG. 1 shows a system of the prior art.
Figure 2:
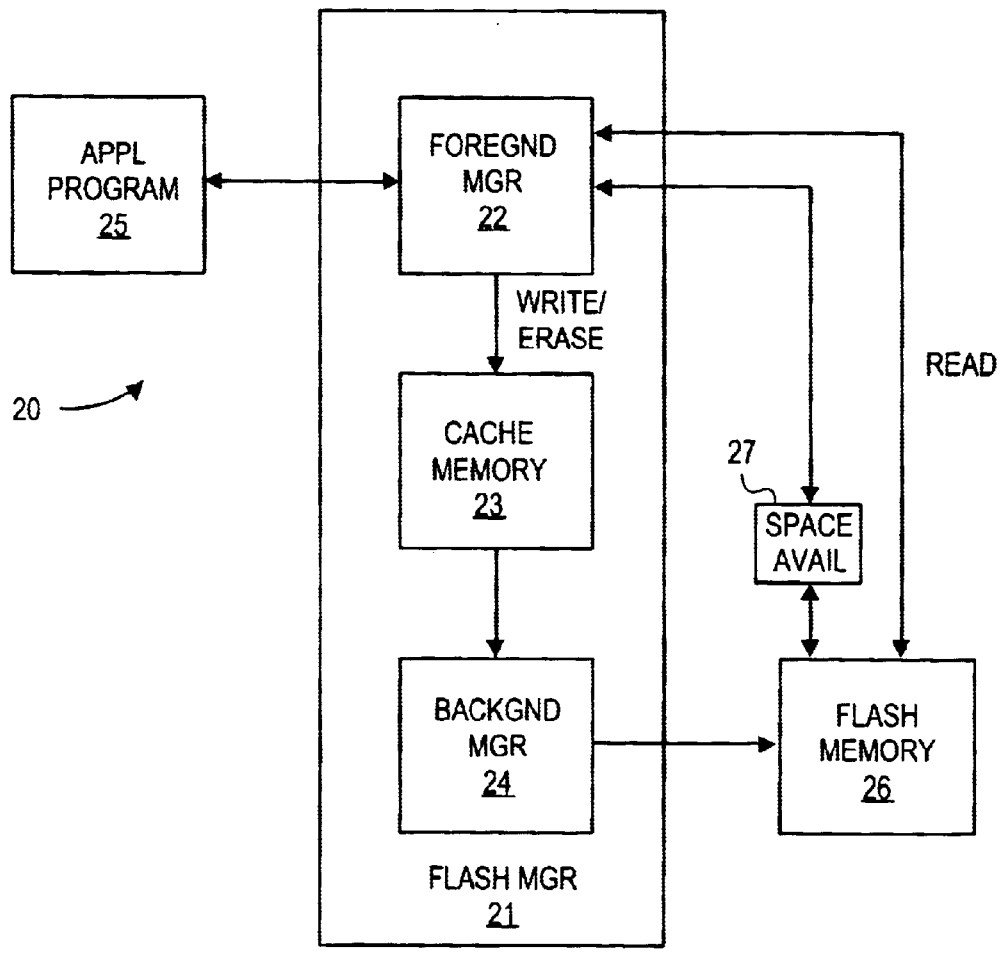
FIG. 2 shows a system of the invention.

FIG. 2 shows a system 20 of an embodiment of the invention. Application program 25 can make read and write calls to flash manager 21. Foreground manager 22 can perform reads directly, while sending write commands to cache memory 23 after it determines if space is available through the space available function 27. Although shown as a block between foreground manager 22 and flash memory 26, the space available function can be accomplished in various ways, such as tracking space usage within flash manager 21 or sending a query to flash memory 26. The exact manner of determining available space in flash memory 26 is not important to the practice of the invention. Background manager 24 can retrieve the write and erase command entries from cache memory 23 and post them to flash memory 26. Unlike a conventional system, background manager 24 need not re-determine if space is available before writing data to memory.

The invention can employ a posted write-through cache approach. When the data from a flash write command is placed in cache 23, the data is not simultaneously written to flash memory 26, but is subsequently written to flash memory 26 as soon as background manager 24 can get to it. Write data can be written to flash memory 26 by background manager 24 in the same order in which it is received from foreground manager 22. Once written to flash, the associated caches entries can be deleted.

Deleting entries from cache 23 after they have been posted to flash memory 26 has several advantages. A typical cache memory eventually fills up, leaving no space for new entries. This requires flushing (i.e., deleting) various entries from the cache to make room for new entries. A certain amount of prediction is involved in determining which entries can be flushed with minimal impact on system performance, i.e., which entries will be least likely to be accessed again.

By deleting cache entries immediately upon posting them to flash memory 26, cache memory 23 is constantly being drained and is much less likely to become full. In those instances in which it does fill up, it can be drained, and space made available, simply by waiting until background manager 24 posts more write data to flash memory 26 and deletes the associated entries. No prediction schemes are necessary, since no data is accessed from cache after it is posted.

The division of tasks between the foreground and background managers can be different than in conventional systems. Foreground manager 22 can receive and acknowledge commands from application program 25, determine which commands need to be placed in cache memory 23, and deliver read commands to flash memory 26. After determining the available space in flash memory 26, foreground manager 22 can also determine which specific locations in flash memory will be addressed by the write commands, including all the locations needed by a multi-byte write operation. Once these locations are assigned to the write data by the foreground manager, they are unavailable for subsequent write commands, and background manager 24 will not have to re-determine if space is available when the current write command is posted to flash memory 26. If additional blocks are subsequently erased by background manager 24, that might make more space available than was predicted by foreground manager 22, but will not result in less space being available, and so no space-available determination by background manager 24 is needed. This prevents the conventional "flash full" error condition, in which the background manager is the first to determine that the predicted space is not available, and must undertake emergency response measures.

The background can process one cache entry at a time, and invalidate the entry when done. When the background invalidates an entry, the foreground can then use this cache space for subsequent entries. Pointers and counters can be maintained to track valid and invalid entries, similar to a ring buffer, in which the appropriate pointer can wrap to the beginning of the cache space when the end of the cache space is reached. Rings buffers and the associated pointers and counters are well known, and are not further described here.

One embodiment of a flash memory system of the invention can also handle commands with differing priorities. Cache entries can be processed in priority order by the background, and priorities can be reevaluated after each cache entry is executed. When there are no entries in a higher priority cache, then the next lower priority cache can be processed. Commands to flash can be assigned various priorities by the flash manager, by the application program, by another entity, or any combination of those. Regardless of the source of the priority assignment, cache memory 23 can include a separate tag array and data array for each priority.

Figure 3:
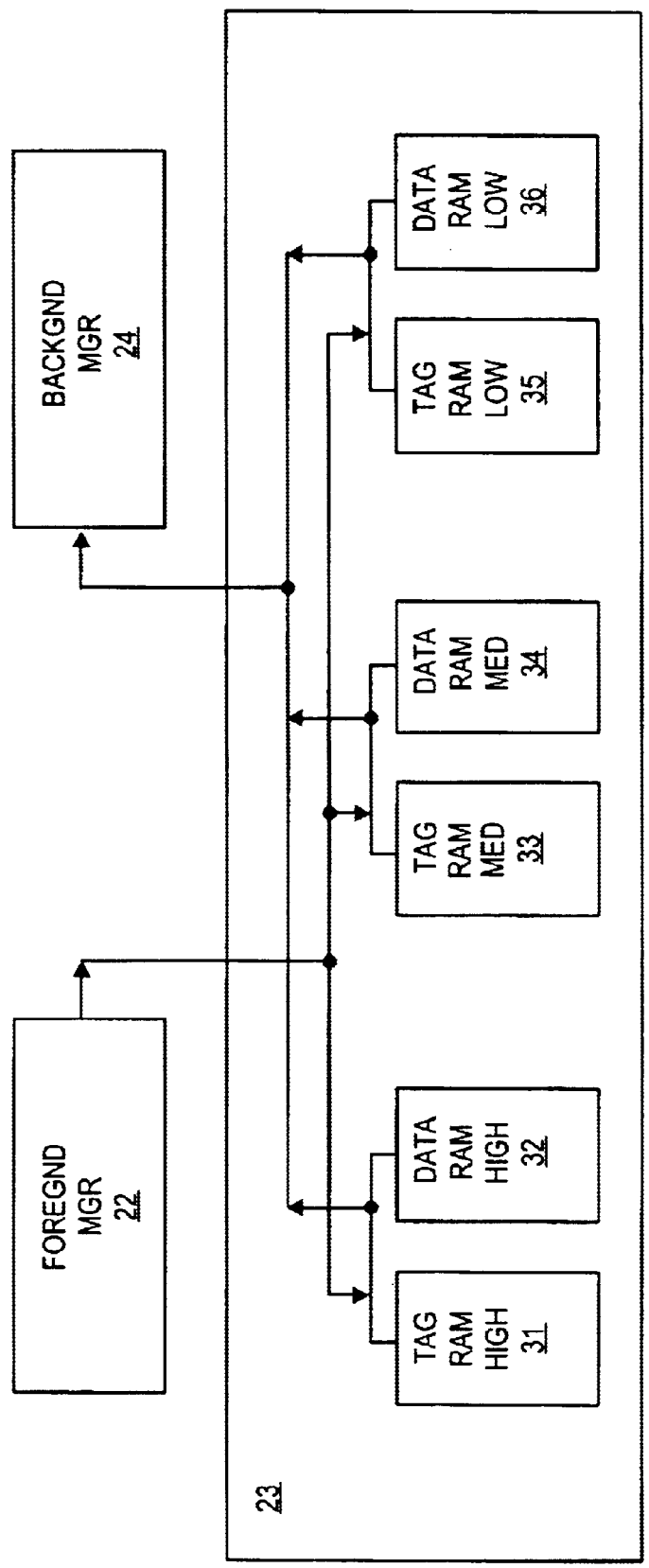
FIG. 3 shows some of the internal structure of the cache memory.

FIG. 3 shows a system with three different priority levels: high, medium, and low. As in a conventional cache memory, cache 23 can have a tag array and a data array, both of which can be implemented with RAM memory. One embodiment provides three sets of tag and data arrays, one for each of three different priority levels. Tag and data arrays 31, 32 are shown for high priority commands, tag and data arrays 33, 34 are shown for medium priority commands, and tag and data arrays 35, 36 are shown for low priority commands. All high priority commands can be handled first, all medium priority commands can be handled next, and all low priority commands can be handled last. Within each priority, commands can be processed through cache memory in the order received. In one embodiment, the amount of memory devoted to the tag/data arrays for each priority can be programmably changed.

The information placed in the tag and data arrays can be identified as tag and data fields, respectively. A data field can contain the data that is to be written or otherwise processed with the command. Data may include a header, which is an identifying marker in flash that labels a segment of associated data in flash. The header can label the data as valid or invalid (since small pieces of obsolete data cannot be individually erased, they are simply marked as invalid), and can identify the associated locations in flash as allocated or not allocated to prevent a location that has been earmarked for use from being subsequently used by another command. The tag field can include the target address in flash memory for the write or erase command, the size of the data to be transferred, and state bits to indicate other characteristics of the cache entry so that the background can process it appropriately. Table 1 describes various types of information that can be included in the tag field in one embodiment.

Figure 4:
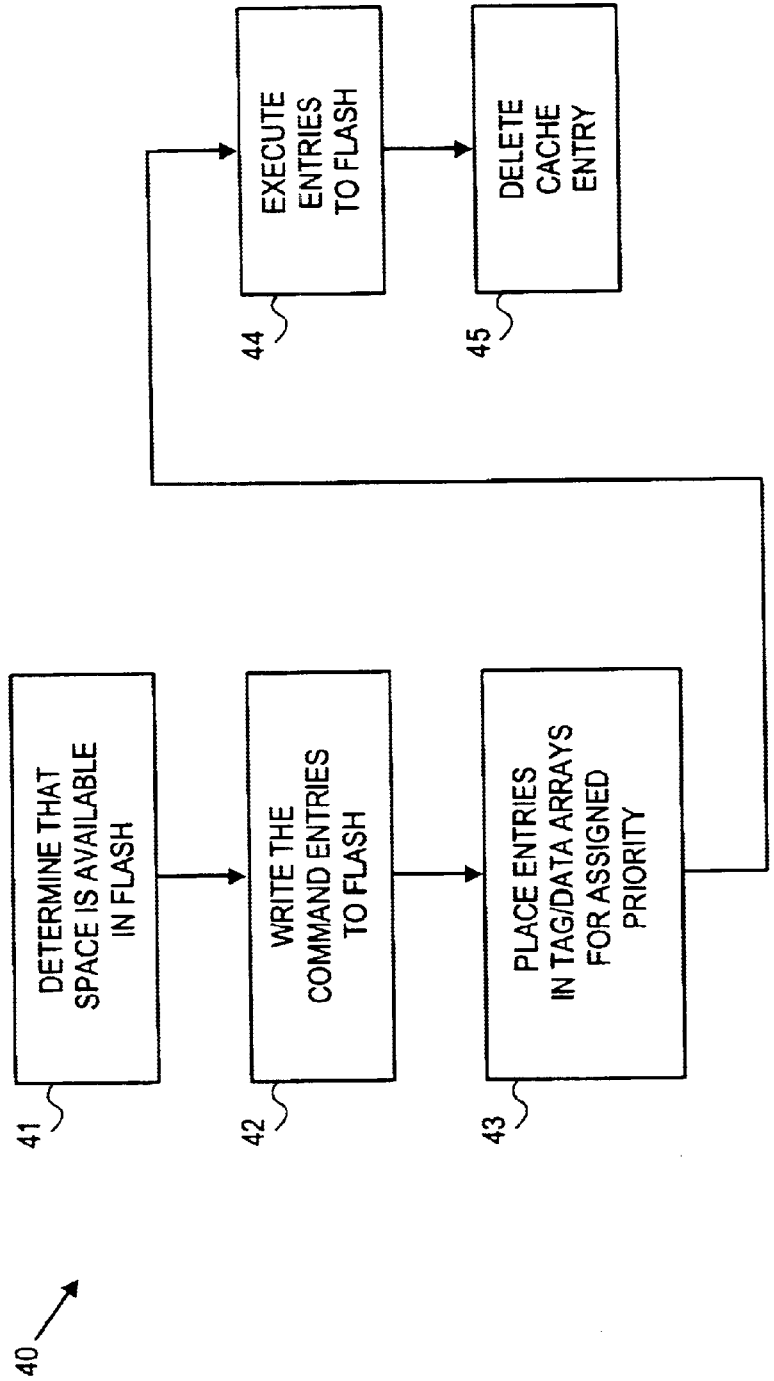
FIG. 4 shows a flow chart of a method of the invention.

FIG. 4 shows a flow chart 40 of a method of the invention. Beginning with the foreground manager, at step 41 a determination is made that enough space is available in flash to execute the command. At step 42, the command is broken into multiple entries and written into cache memory. Step 43 places these entries in the tag and data arrays corresponding to the priority designated for the command. Subsequently, the background manger takes over, executing each cache entry to flash memory at step 44. Executing a write entry includes reading data from cache, and writing the data to the location(s) in flash memory designated by the entry. Executing an erase entry includes erasing the block in flash memory designated by the entry. At step 45, the cache entry is deleted, freeing up that space for future cache entries.

TABLE 1

| Contents | Tag Field |
| --- | --- |
| Address | The physical address in Flash where the associated data in the cache RAM is to be written. Used by the background manager to place the header/data into Flash, or to erase a block in Flash. |
| Size | The size of the associated data in the cache RAM. This determines the amount of space in flash memory that is needed. |
| State bit - header allocated | The header in the cache RAM is taken to the allocated State in Flash. |
| State bit - header/data valid | The header/data in cache RAM is taken to the valid state in Flash. |
| State bit - invalidate next | Indicates to background that the next cache entry is a header to be invalidated. This helps reduce cache entries. The background takes the current entry to the allocated state, and if this bit is set, the next entry is processed to invalidate the old header before moving this entry to the valid state. |
| State bit - copy data | Cache RAM contains the source Flash address for the copy. |
| State bit - copy block units | A reclaim component that copies all the valid headers and associated data in the block identified by Address to a spare block. This is a high-level reclaim |

TABLE 1-continued

| Contents | Tag Field |
|---|---|
| | command to help reduce cache entries. The background breaks it up into one copy per reclaim state to allow intermixed 'reclaim in progress" writes. |
| State bit - erase | A reclaim component, indicating the designated block is to be erased. Size is set to zero and the reclaim component state bit is also set. |
| State bit - reclaim component | Indicates to the background that this entry is a component of the reclaim process. |
| State bit - reclaim needed | Indicates the reclaim is 'needed', and this reclaim component must therefore be processed prior to subsequent writes. |

Other features that can be implemented in various embodiments are described in more detail below.

Read Processing

Between the time a write entry is placed in cache and the time it is executed to a location in flash memory, only the cache memory will have the correct version of the associated data. During that time, a read operation to flash can retrieve the data from cache rather than flash memory. Thus a read operation can search cache for the data, and also perform a read to the flash memory. If the data is in cache, i.e., if a cache 'hit' occurs, the cached data can be used and the read to flash ignored, aborted, or never attempted, depending on the cache read-through structure. In this sense the cache memory can operate like a conventional cache memory. However, once the cached write has been posted to flash memory, the cache entry can be deleted from cache rather than retained for future reads as it is in conventional cache memories. This is because, if the same data is in both cache and flash, the cache entry will not noticeably improve read performance and may even degrade it. Retaining a command in cache 23 after it had been posted to flash memory 26 would unnecessarily occupy space in the cache that would not be available for subsequent commands. Also, the read performance of embedded system flash memory is comparable to that of the static random access memory (SRAM) that is typically used for cache memory, resulting in negligible speed improvement when a cache hit occurs. Thus deleting posted commands from cache makes more efficient overall use of cache memory, while not having any significant impact on read response times.

If a read operation produces a cache 'miss', i.e., if the data is not in the cache, the cache is not updated with the data as in a conventional cache. Since a purpose of the cache of the invention is to facilitate write operations rather than read operations, there would be no viable reason to place the data in cache if the correct data is already in flash memory.

In one embodiment, a multi-byte read operation may produce a cache hit on some parts of the data and a cache miss on other parts of the data. In this case, the data found in the cache can be combined with the remaining data from flash to produce the final data.

Associativity

One embodiment uses a fully associative cache technique. Although this can require greater search times while looking for a cache hit, a fully associative approach can keep the cache size small while providing maximum flexibility.

The cache memory can also be fully implemented in software, in which a portion of the memory used by the flash manager is designated as cache memory, and used only for that purpose. In this invention, flash can be considered the equivalent of main memory in a conventional memory hierarchy, while the memory being used for cache can be considered the equivalent of cache memory in a conventional memory hierarchy.

Cache Line Size

A variable line size can be employed because of the variable sized nature of flash file management. In one embodiment, write lines can vary in size from a byte of data to an entire fragment of data, typically 128–512 bytes. The size can be kept in the tag array along with the destination address.

Cache Replacement Policy

In a typical cache system, data is maintained until a 'cache full' or 'cache flush' situation occurs. If the cache is full, selective cache entry replacement typically occurs. If the cache is flushed, all entries are invalidated. In one embodiment of this invention, selective replacement for a full cache need not occur because the cache entries are post-written and then deleted, in the order in which they were entered into cache. Thus, the invention can basically employ a first-in first-out (FIFO) policy. If the cache is full, a new cache entry can be delayed until adequate space is made available by draining the cache through the orderly writes to flash. A 'cache flush' capability may not be needed because the invention naturally flushes the cache through its cache replacement policy.

Code Restructuring

Most conventional background functions can be moved to the foreground. In one embodiment, all file management conventionally done by the background and reclaim tasks can be done by the foreground, except for the actual writing or erasing of flash. A single background task can have the role of processing cache entries and writing or erasing the flash. The background task can also handle many aspects of power-loss recovery (PLR) flow and higher-level reclaim states for efficiency reasons.

The queue of a conventional system can be eliminated and check-for-space can be executed just once by the foreground manager. Entries into the cache can contain exact final destinations into flash. Thus, a background "flash-full" condition does not occur because the background manager does not decide where to place the data, but rather places the data in the locations previously allocated by the foreground manager.

Reclaims

With flash memories, a reclaim process is a process that erases a block of memory and makes it available for subsequent write operations, thus 'reclaiming' the block for use. If the old block (the block to be erased) contains any data that must be saved, a reclaim may include reading some of the data from the old block before erasure, and placing that data into a new, previously-erased block for subsequent use. The old data may or may not be combined with other data from other sources before writing it into the new block. Thus a reclaim process may include one or more reclaim components, such as: 1) read old data from old block, 2) write old data to new block, 3) write other data to new block, and 4) erase old block. Each of these can be a separate cache entry. Since each may be processed separately, other cache entries may be processed in between related reclaim components. A reclaim-in-progress indicator can be used to indicate that a non-atomic reclaim operation is being conducted.

A reclaim component can be classed as 'needed' or 'not needed'. If flash memory is full, or at least does not have enough available space to complete the current write operation, a block of flash memory must be reclaimed to provide the necessary space to complete the write. The reclaim components of this reclaim operation would be 'needed', since they must be completed before normal processing can resume. However, some reclaims are done speculatively, i.e., blocks are reclaimed in anticipation of a subsequent need that does not yet exist. These can be classed as 'not needed'. Needed reclaims can be given the highest priority, while reclaims that are not needed can be given a lower priority. Both types of reclaim components can be initiated by the foreground manager and placed into cache for subsequent processing by the background manager. The tag field can hold a state bit indicating whether the reclaim component is needed or not.

If a cached reclaim component is entered as 'not needed', then subsequent writes in the cache can be processed first. In one embodiment, this is the only instance in which cache entries are processed out of order. If the reclaim component is entered as 'needed', then it can be processed in order when the background executes this cache entry. Since it is entered into the highest priority cache, entries in the lower priority caches will not be processed until the needed reclaim components have been executed. If a cached 'needed' reclaim component is found and there are prior 'not needed' reclaim components, then all the 'not needed' components can be changed to the 'needed' state, and processed immediately.

Cache Full Handling

A 'cache full' condition indicates there is no space, or insufficient space, remaining in cache to hold the current write operation. This is more likely to occur for commands involving large amounts of data, such as a "replace group table" command for a large table. The cache may not be able to accept this entry until a cached reclaim executes. Even worse, the reclaim may need to complete and subsequent cached writes may need to execute in order to provide adequate cache to the final cache entry.

In one embodiment, cache full prediction is not employed because it is time consuming, and would have to be done at the beginning of every command. Rather than calculate if the command will fit in the cache, two other options can be provided in the application program interface (API): wait and no-wait. If a cache full condition occurs and 'no-wait' is specified, then the 'cache full' status can be returned up through an API stack to be dealt with by the application program. If the cache full condition occurs and 'wait' is specified, then command processing can wait until the cache has been drained enough to make room for the command.

In one embodiment of the invention, the flash manager can be implemented in software, and the cache memory can be implemented as a portion of the same memory from which the flash manager is executed. In another embodiment of the invention, the flash manager can be implemented in firmware and the cache memory can be implemented in volatile memory addressable by the same processor that executes the flash manager code. In still another embodiment of the invention, portions of the flash manager can be implemented in circuitry, including one or more state machines.

The invention can be implemented as a method.

The invention can also be implemented as instructions stored on a machine-readable medium, which can be read and executed by at least one processor to perform the functions described herein. A machine-readable medium includes any mechanism for storing or transmitting information in a form readable by a machine (e.g., a computer). For example, a machine-readable medium can include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The foregoing description is intended to be illustrative and not limiting. Variations will occur to those of skill in the art. Those variations are intended to be included in the invention, which is limited only by the spirit and scope of the appended claims.

I claim:

1. A method, comprising:

writing, in a first process, a flash memory command to a cache memory, said writing including determining if enough space is available in the flash memory to execute the flash memory command to the flash memory the flash memory command including one or more addresses of the flash memory where the flash memory command is executed upon;

executing, in a second process independent of the first process, the flash memory command from the cache memory to the one or more addresses of the flash memory, without having to perform the determining again; and deleting the flash memory command from the cache memory immediately after the executing.

2. The method of claim 1, wherein the flash memory command is one of a write command and an erase command.

3. The method of claim 1, wherein said writing to the cache memory and said executing to the flash memory are executed with code in a programmable machine.

4. The method of claim 3, wherein said writing to the cache memory is a foreground operation.

5. The method of claim 3, wherein said executing to the flash memory is a background operation.

6. The method of claim 1, wherein said writing to the cache memory includes:

specifying a priority level associated with the flash memory command; and storing the flash memory command in a tag array and data array associated with the specified priority level, the tag array and the data array including
a first tag array and a first data array to store the command having a first priority, and
a second tag array and a second data array to store the command having a second priority.

7. The method of claim 1, further comprising:

receiving a read request from an address of the flash memory;

in response to the read request, examining the cache memory to determine whether the cache memory contains data corresponding to the requested address; and retrieving the data from the cache memory if the cache memory contains data corresponding to the requested address.

8. The method of claim 7, further comprising retrieving data from the flash memory based on the requested address if the cache memory does not contain the data corresponding to the address requested.

9. A machine-readable medium having stored thereon instructions, which when executed by a processor cause said processor to perform;

receiving a request for accessing a flash memory determining whether the flash memory contains sufficient space for the request;

generating a flash memory command based on the request if the flash memory contains sufficient space;

writing the flash memory command to a cache memory in a foreground process;

executing the flash memory command from the cache memory to a flash memory in a background process without having to determine whether the flash memory contains sufficient space again; and deleting the flash memory command from the cache memory immediately after the executing.

10. The medium of claim 9, wherein the flash memory command is one of a write command and an erase command.

11. The medium of claim 9, wherein the cache memory includes:

a first tag array and a first data array to store the command if the command has a first priority; and a second tag array and a second data array to store the command if the command has a second priority.

12. The medium of claim 9, wherein the processor further performs:

receiving a read request from an address of the flash memory;

in response to the read request, examining the cache memory to determine whether the cache memory contains data corresponding to the requested address; and retrieving the data from the cache memory if the cache memory contains data corresponding to the requested address.

13. The medium of claim 12, wherein the processor further performs retrieving data from the flash memory based on the requested address if the cache memory does not contain the data corresponding to the address requested.

14. An apparatus, comprising:

a flash memory;

a cache memory coupled to the flash memory to store a command to be executed to the flash memory, said cache memory including:

a first tag array and a first data array to store the command if the command has a first priority; and a second tag array and a second data array to store the command if the command has a second priority; and a flash manager coupled to the flash memory and the cache memory to write the command into the cache memory, read the command from the cache memory, execute the command to the flash memory, and delete the command from the cache memory; wherein the flash manager includes a foreground manager to:

determine if the flash memory has enough available space to execute the command; and assign a flash memory address to the command.

15. The apparatus of claim 14, wherein said flash manager is implemented in one of software and firmware.

16. The apparatus of claim 14, wherein the flash manager receives a read request from an address of the flash memory, examines the cache memory to determine whether the cache memory contains data corresponding to the requested address in response to the read request, and retrieves the data from the cache memory if the cache memory contains data corresponding to the requested address.

17. The apparatus of claim 16, wherein the flash manager retrieves data from the flash memory based on the requested address if the cache memory does not contain the data corresponding to the address requested.

18. A system, including:

a processor;

a flash memory;

a cache memory coupled to the flash memory and the processor to store a command from the processor to be executed to the flash memory; and a flash manager coupled to the flash memory and the cache memory to write the command into the cache memory in a foreground process, read the command from the cache memory, execute the command to the flash memory in a background process, and delete the command from the cache memory, the foreground process including determining whether the flash memory contains sufficient space with respect to the command, and the background process being performed without having to repeat the determining operation.

19. The system of claim 18, wherein said flash manager is implemented in one of software and firmware.

20. The system of claim 18, wherein the flash manager receives a read request from an address of the flash memory, examines the cache memory to determine whether the cache memory contains data corresponding to the requested address in response to the read request, and retrieves the data from the cache memory if the cache memory contains data corresponding to the requested address.

21. The system of claim 20, wherein the flash manager retrieves data from the flash memory based on the requested address if the cache memory does not contain the data corresponding to the address requested.

22. A system, including:

a processor;

a flash memory;

a cache memory coupled to the flash memory and the processor to store a command from the processor to be executed to the flash memory; and a flash manager coupled to the flash memory and the cache memory to write the command into the cache memory in foreground, read the command from the cache memory, execute the command to the flash memory in background, and delete the command from the cache memory, wherein the flash manager includes a foreground manager to:

determine if the flash memory has enough available space to execute the command; and assign a flash memory address to the command; and wherein the cache memory includes:

a first tag array and a first data array to store the command if the command has a first priority; and a second tag array and a second data array to store the command if the command has a second priority.

* * * * *